J. W. STEELE.
WORK HOLDER FOR SAW TABLES.
APPLICATION FILED JUNE 6, 1919.
1,410,134.
Patented Mar. 21, 1922.
2 SHEETS—SHEET 1.
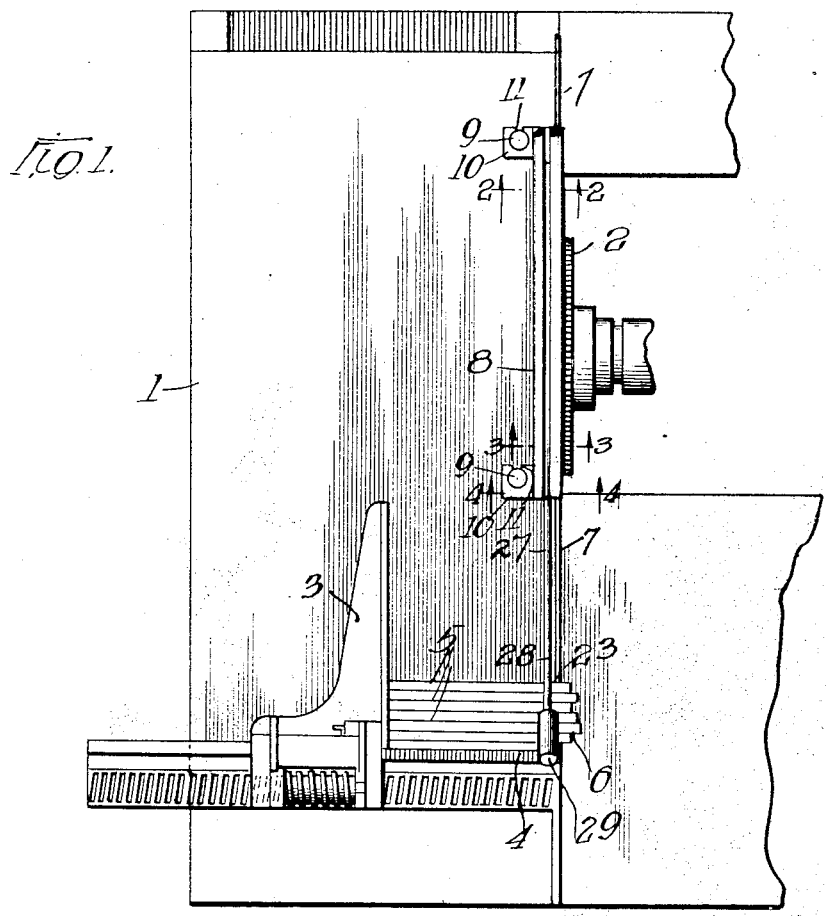
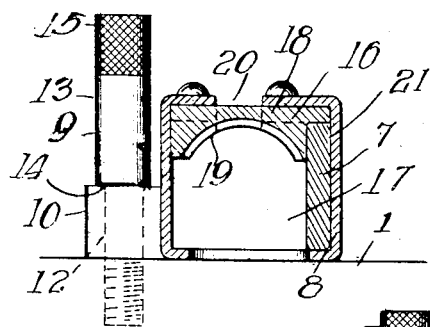
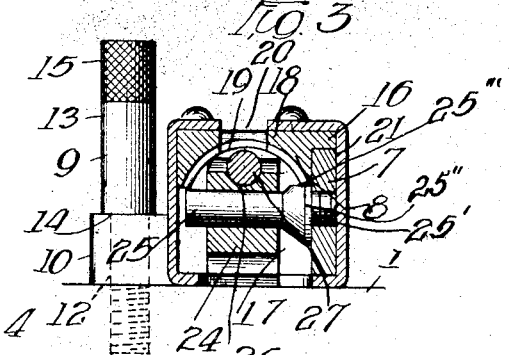
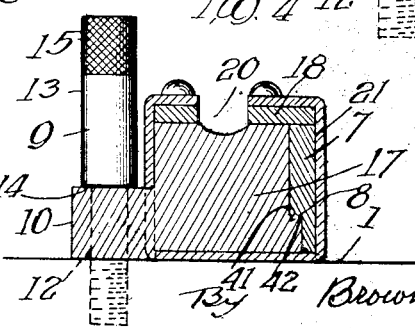
Witnesses:
Harry R. White
W. F. Kilroy
Inventor
John W. Steele
Brown Boettcher & Diener
Attys.

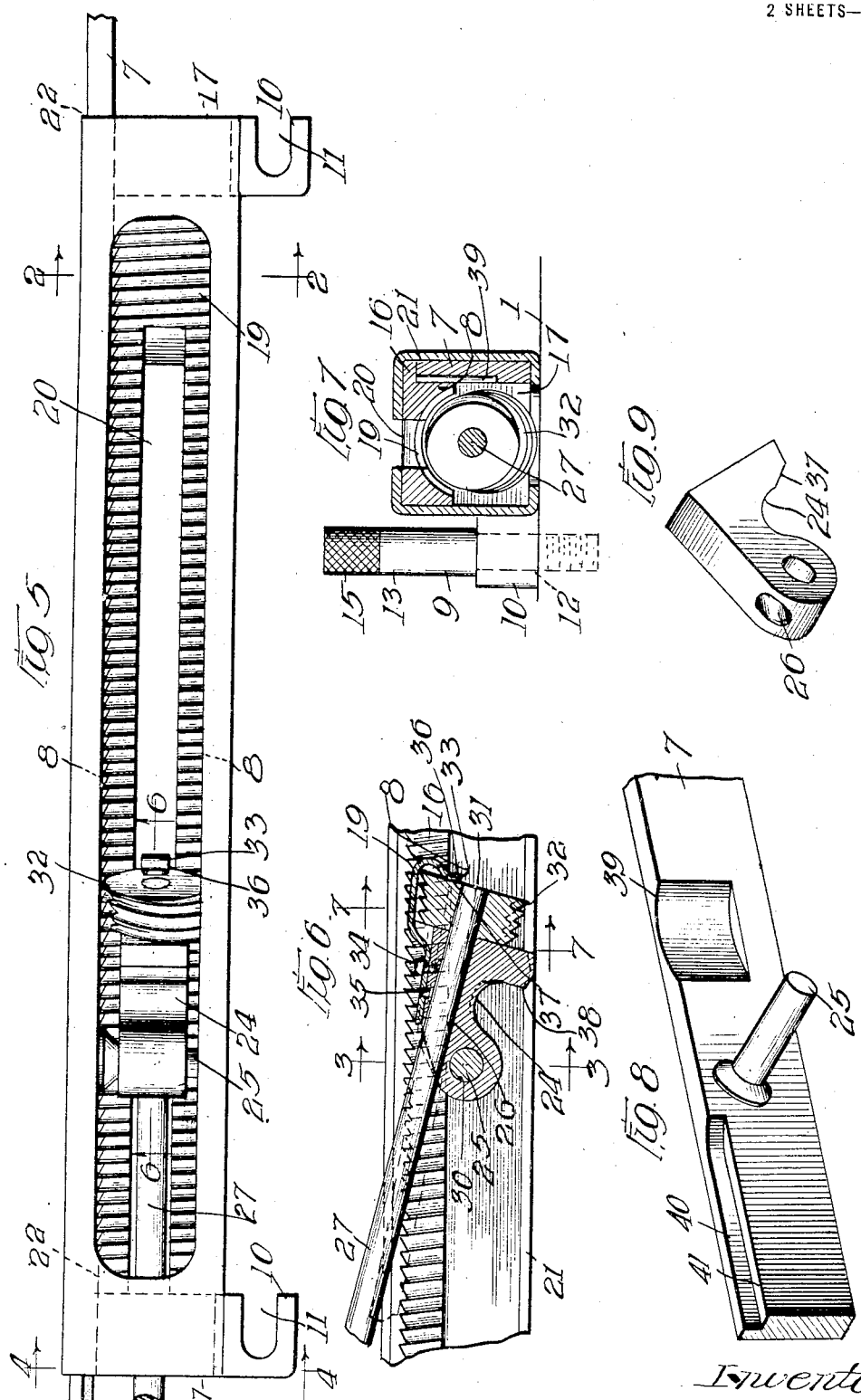

UNITED STATES PATENT OFFICE.

JOHN W. STEELE, OF CHICAGO, ILLINOIS,

WORK HOLDER FOR SAW TABLES.

1,410,134.  Specification of Letters Patent.  Patented Mar. 21, 1922.

Application filed June 6, 1919. Serial No. 302,114.

*To all whom it may concern:*

Be it known that I, JOHN W. STEELE, a citizen of the United States, residing at Chicago, in the county of Cook and State of Illinois, have invented a certain new and useful Improvement in Work Holders for Saw Tables, of which the following is a full, clear, concise, and exact description, reference being had to the accompanying drawings, forming a part of this specification.

My invention relates to improvements in work holders for saws for cutting linotype slugs, cuts, etc., and has special reference to improved means for clamping or holding the articles upon the saw table while they are being sawed.

Commonly the saw table is provided with some form of clamping device for accurately and tightly holding the article or articles to be cut upon the saw table while the table top is moved in relation to the saw to accomplish the cutting.

Unless the clamp holds the articles very tightly clamped in position they may and frequently do become loosened and are thrown about by the rapidly revolving saw which is used, causing more or less damage, and frequently resulting in the workman loosing one or more fingers or parts of fingers.

A particular object of my invention is to provide a very simple and effective clamping device, one which can be readily and quickly adjusted to clamp articles of any size, within the capacity of the machine, which can be easily operated to clamp the articles with sufficient pressure to hold them against possible loosening during the sawing operation, which when once tightly clamped, tends to lock itself in clamping condition and thus prevent the disengagement of the clamp or the loosening of the article by the vibration of the machine in operation.

My invention consists in a work holder for application to a saw table, having a longitudinally movable bar adapted to clamp the article to be held against a fixed abutment, the bar controlled by a suitable handle, and a segmental cylindrical rack and a worm adapted to be thrown into and out of engagement by said handle, providing a quick movement for the bar and a powerful screw pressure for the tight holding of the article, the several parts arranged to cause the clamping pressure to hold the handle firmly locked in clamping position and to prevent the loosening of the clamp until it is intentionally disengaged.

Many devices of a similar nature have been produced but they have proven, so far as I have been informed, unsatisfactory and even dangerous in use. The operator in effecting the sawing of the slugs is apt to place his hand upon the group of slugs being cut in pushing the table top forward and if the clamping device does not hold properly the slugs are apt to be thrown about with violence, with the result that the operator frequently loses a finger or part of a finger. The frequent accidents of this nature, with clamping devices commonly used, was the inciting cause of the present invention.

In this device the clamping pressure itself is made use of to lock the operating parts against disengagement and any increased pressure which would tend to loosen the device, heretofore used, tends in the present device to force the operating parts into more tightly locked condition.

My invention will be more readily understood by reference to said accompanying drawings in which:

Figure 1 is a fragmentary top plan view of the saw-table provided with a clamping device embodying my invention in one form;

Figure 2 is a vertical section on the lines 2—2 of Figures 1 and 5;

Figure 3 is a vertical section on the lines 3—3 of Figures 1 and 6;

Figure 4 is a vertical section on the line 4—4 of Figure 1;

Figure 5 is a bottom plan view of the clamping device;

Figure 6 is a fragmentary longitudinal vertical section taken substantially on the line 6—6 of Figure 5;

Figure 7 is a transverse vertical section on the line 7—7 of Figure 6;

Figure 8 is a fragmentary perspective view of the sliding bar; and

Figure 9 is a perspective view of the pivoted bearing member.

In said drawings 1 is a saw frame top which is mounted to slide back and forth in relation to a circular saw 2 which is suitably rotatably mounted adjacent to one edge of the top 1. The top may be provided with an adjustable member 3 against which the type slugs, to be cut, may be positioned, but it is not a necessity. The top is provided with a fixed stop 4 at right angles to the direction of the back and forth movement of the top and against which my improved clamping device is adapted to hold the slugs 5 with a clamping pressure, when the table top is moved forward to cut off the ends 6 of the slugs by means of saw 2.

My improved clamping device comprises a longitudinally movable clamping bar 7 which is guided and movable in an elongated housing 8. The housing 8 is adapted to be clamped upon the table top 1 by means of two vertical clamping screws or bolts 9. The housing 8 is provided at its ends with securing lugs 10 having slots 11 open at their rear ends and the screws 9 have shanks 12 fitting within the slots and their lower ends are threaded into suitable tapped holes provided in the table top. The upper parts 13 of the screws 9 are enlarged to form clamping shoulders 14 for engagement with the upper surfaces of the lugs 10 and the extreme upper ends 15 are knurled for convenience in operating the screws. As the shanks 12 of the screws fit the slots 11 they act both to dowel the housing accurately upon the table top and, when screwed down hard upon the lugs 10, to hold the device tightly clamped to the table top.

The housing 8 comprises a fixed longitudinal member 16 which is provided with the lugs 10 and which is formed with downwardly extending block like ends 17 which carry the lugs 10 extending out sideways from their lower ends. The upper parts of the two end blocks 17 are joined by a horizontal bar 18 which is provided in its under surface with a segmental cylindrical rack 19 and is also provided with a central longitudinal slot 20 extending substantially from one end to the other, as does the rack. One side of the member 16 is cut away to make room for the longitudinal bar 7, as shown in Figure 2 and the bar 7 is held in said cutout portion by a box-like sheet metal casing 21 which surrounds the member 16. The longitudinal edges of the casing are substantially coincident with the edges of the slot 20. The ends 17 of the member 16 and the sides of the casing 21 form guide openings 22 through which the bar 7 moves, and by which it is accurately guided.

The bar 7 is substantially twice as long as the housing 8 so that even if its clamping end 23 be moved substantially into contact with the stop 4 the opposite end of the bar will still be guided in the guide opening 22 at the opposite end of the housing. The lugs 10, as best shown in Figures 2 and 4, project below the general lower surfaces of the ends 17 the thickness of the sheet metal casing so that the lugs seat solidly upon the table top 1.

For sliding the clamping bar 7 longitudinally and for forcing it against the slugs 5 with a clamping pressure, I provide a bearing member 24 pivotally mounted to swing up and down on a horizontal pin 25 rigidly carried by and projecting inwardly from the bar 7.

This pin is arranged about the middle of the length of the bar and immediately below the lower edge of the longitudinal bar 18. The bearing member 24 is provided with a longitudinal bearing opening 26 which is inclined upwardly toward the forward end of the device and which provides a bearing for a rotatable operating shaft or rod 27 which extends upwardly through the slot 20 and toward the front edge of the saw table. The forward end 28 of the operating rod 27 is provided with a suitable handle 29 by which the rod 27 can be swung up and down and rotated. To hold the pin permanently in position, I provide its fixed end 25', with a screw thread fitting in a suitable threaded hole in the bar 7, and the pin has a flanged shoulder 25'' adapted to be screwed hard against the inner face of the bar 7. To prevent the pin from becoming loosened and unscrewing in use I cut away a portion of the base 25'' providing a flat bearing shoulder 25''' adapted to contact with the lower edge of the rack. The rack thus prevents the unscrewing of the pin when the device is assembled in working condition.

The opening 26 for the rods 27 and the opening 30 for the pin 25 pass through the block 24 close together as best shown in Figure 6.

The body of the block 24 extends forwardly from the pin 25 and it is adapted to be swung up and down by means of the rod 27. On the lower end 31 of the rod 27 beyond the pin 25 and against the end of the block 24 I provide a screw worm 32 which is adapted to be rotated by means of the rod 27. The screw worm is secured to the rod 27, and is adapted to be lifted up and down into and out of mesh with the rack 19 by the up and down movement of the block 24.

To hold the rod 27 with the screw worm 32 against endwise movement relatively to block 24 I provide an overhanging stop member 33 secured to the upper side of the block 24 by the screw 34 and held in position by a dowel pin 35. The free end 36 of the slot member extends up through the slot 20 and around the worm 32 and is formed down around the outer end of the worm and is bent inwardly near the center of the worm to form a stop bearing 37. As the rod 27 projects upwardly at an angle even when the worm 32 is in mesh with the rack 19 the worm is tapered or cone shaped so as to properly fit into the rack longitudinally across the whole face of the worm, when in mesh.

For effecting the clamping action the bar 7 is forced in the direction of the arrow Figure 6, and I make the teeth of the rack and the engaging thread of the screw worm with cooperating vertical faces for engagement to take the clamping pressure the opposite faces of the teeth and thread being preferably substantially 60 degrees so as to require a minimum of up and down movement of the worm for effecting the engagement and disengagement of the rack and screw. For operating the device, it having been secured upon the table top by the screws 9, the handle end of the shaft or rod 27 is raised thus disengaging the worm from the rack, then by means of the rod 27 the bar 7 is moved forward until its forward end 23 engages the slugs 5, then the handle end of the rod 27 is depressed thus raising the screw worm into engagement with the rack and then the screw worm is rotated, to the right, by means of the handle 29 and the bar 7 is forced forward with the desired clamping pressure, the thread of the worm being a left hand thread for this purpose. It is obvious that if the screw worm is not in accurate registry with the rack as it is raised it can be brought into accurate registry to mesh properly therewith by rotating it by the handle 29.

I find that sufficient pressure can readily be produced by use of a double thread instead of a single thread on the worm and similar teeth on the rack, and this double thread effects a quicker setting of the bar 7.

To limit the downward movement of the worm to prevent its scraping on the table top 1, I provide an extension 38 on the block 24 having a smooth lower end for contact with the table top, so that in disengaging the worm from the rack the handle 29 is lifted as far as possible, this lifting movement being limited by the engagement of the extension 38 with the table top and the handle is held in this raised position while the bar 7 is slid endwise.

The device can be operated very quickly. The necessary clamping pressure can be easily produced and once the slugs are clamped the worm cannot be jarred free of the rack in the sawing operation as the upwardly extending end 28 of the shaft 27 and the handle 29 greatly overbalance the block 24 and worm 32 and tend to hold the worm in an engagement. Furthermore, the clamping pressure produced between the upper part of the worm and the rack tends to rotate the member 24 on the pin in a direction to hold the worm in mesh with the rack and this locking effect is added to the counterbalancing locking of the shaft 27 and handle 29 and consequently it is a practical impossibility for the device to become loosened once it has been clamped.

This rotating tendency of the locking pressure upon the block 24 might tend to spring the two parts of the bar 18 upwardly and one function of the sheet metal casing is to strengthen the device and prevent the springing of the bar 18. The side plates 21', of the sheet metal casings 21 with their inturned upper and lower edges engaging the top and bottom of the end blocks and engaging the whole length of the two parts of the bar 18 form tension members which effectually retain the bar 18 in true horizontal position and prevent the upward bending or springing thereof by an ordinary clamping pressure.

For the purpose of providing a solid bottom guide shoulder for the forward end 23 of the bar 7, I cut away the bar, as shown in Figure 8, making its lower edge 40 narrower than the full thickness of the bar and providing a longitudinal shoulder 41 on the inner side of the bar, and I provide the forward block 17 of the member 16 with a cooperating shoulder 42 so that I do not depend, at this end of the bar, upon the lower wall of the casing 8, to guide the bar but provide a guide groove for the bar having upper and lower walls formed in the member 16.

As shown in Figure 8, I provide clearance for the worm 32 in the bar 7 by providing the bar with a shallow depression 39.

As many modifications of my invention will readily be suggested to one skilled in the art, I do not limit or confine my invention to the specific structures herein shown and described, except within the scope of the appended claims.

I claim:

1. A work holder for application upon a saw table comprising a longitudinally movable bar adapted to clamp the work against an abutment, a relatively fixed screw rack arranged parallel with the bar, a rotatable screw member pivotally mounted on the bar for engagement and disengagement with the rack and adapted to be disengaged for free movement of the bar and to be rotated when engaged with the rack for forcing the bar forward with screw pressure, the pivotal mounting of the screw arranged to cause the said screw pressure to hold the screw in engagement with the rack.

2. The improvements herein described, comprising a work holder for application upon a saw table, consisting of a longitudinally removable clamping bar adapted to hold the work against a relatively fixed abutment on the table, a relatively fixed slotted screw rack arranged parallel with the bar, a rotatable screw for engagement with the rack and pivotally mounted below the rack on said bar, a handle concentric with said screw and extending upward through the slot in the rack, the pivotal mounting of the screw arranged in advance of the screw and below the rack, whereby the reaction of the clamping pressure tends to move the screw on its pivot toward the rack and thereby hold it in engagement.

3. In a work holder of the kind described, a relatively fixed segmental cylindrical screw rack, a pressure bar parallel with the rack and longitudinally movable relatively thereto, a cone shaped screw dog pivotally mounted on the bar beneath the rack and adapted to be swung on its pivot into and out of engagement with the rack, the pivot arranged beyond the small end of the screw and beyond the center line thereof from the rack, so that the clamping pressure tends to hold the screw dog in the rack.

4. In a work holder of the kind described, a box like member, a bar slidable through the box for effecting the holding of the work, a segmental cylindrical rack in the upper part of the box, a rotatable screw dog pivotally mounted on the bar beneath the said rack and adapted to be swung into and out of engagement with the rack, an axial handle on the screw, a longitudinal slot in the rack through which the handle projects the raising and lowering of the handle disengaging and engaging the screw with the rack, and the rotation of the handle applying screw pressure to the bar when the screw is engaged therewith.

5. In a device of the kind described, a longitudinally movable work clamping member, a frame-work in which the member is guided, two parallel rack members at the upper part of the frame-work, a lever clamping member pivotally mounted on the longitudinally movable member and adapted to be pressed upwardly against the rack members in the work clamping operation, and means for restraining said rack members against being sprung upwardly.

In witness whereof, I hereunto subscribe my name this 3rd day of June, 1919.

JOHN W. STEELE.